United States Patent [19]
Gallup et al.

[11] Patent Number: 5,268,108
[45] Date of Patent: Dec. 7, 1993

[54] CONTROL OF SCALE DEPOSITION IN GEOTHERMAL OPERATIONS

[75] Inventors: Darrell L. Gallup, Chino; John L. Featherstone, El Centro, both of Calif.

[73] Assignee: Union Oil Company of California, Los Angeles, Calif.

[21] Appl. No.: 717,527

[22] Filed: Jun. 19, 1991

[51] Int. Cl.⁵ .............................................. C02F 5/14
[52] U.S. Cl. ............................ 210/698; 60/641.5; 210/699; 210/700; 210/701; 210/727; 210/734; 210/737; 210/747; 210/713; 252/631; 252/633
[58] Field of Search ................. 60/641.2, 641.5; 210/713, 714, 698–701, 723, 726, 727, 728, 734, 747, 732, 737; 252/631, 633

[56] References Cited

U.S. PATENT DOCUMENTS

| | | | |
|---|---|---|---|
| 3,336,221 | 8/1967 | Ralston | 210/700 |
| 3,663,448 | 5/1972 | Ralston | 210/700 |
| 3,958,635 | 5/1976 | Zilch et al. | 210/700 |
| 4,328,106 | 5/1982 | Harrar et al. | 210/700 |
| 4,510,059 | 4/1985 | Amjad et al. | 210/701 |
| 4,728,438 | 3/1988 | Featherstone et al. | 210/747 |
| 4,765,913 | 8/1988 | Featherstone | 210/747 |
| 4,933,090 | 6/1990 | Gill et al. | 210/701 |
| 5,044,439 | 9/1991 | Cenegy et al. | 210/701 |
| 5,049,297 | 9/1991 | Morris et al. | 210/696 |

*Primary Examiner*—Peter Hruskoci
*Attorney, Agent, or Firm*—Charles L. Hartman; Gregory F. Wirzbicki

[57] ABSTRACT

Radioactivity and fluoride ion are inhibited or prevented from precipitating in scale formed from a geothermal brine by adding a dispersant to the cooling brine solution. Preferred dispersants include polyacrylates and polyphosphonic acids.

44 Claims, 3 Drawing Sheets

CONTROL OF SCALE DEPOSITION IN GEOTHERMAL OPERATIONS

BACKGROUND OF THE INVENTION

1. Field of the Invention

This invention relates to methods of inhibiting and preventing the deposition of alkaline earth scale from geothermally derived brines, particularly to methods of inhibiting the precipitation and preventing the inclusion of radioactive minerals and fluoride containing minerals in scale derived from geothermal wells.

2. State of the Art

Large subterranean aquifers naturally produce steam or hot aqueous liquids, or, as used herein, "geothermal" steam or liquids. Sources of geothermal steam or liquids are found throughout the world. These aquifers, which often contain thermal energy in vast amounts, are most commonly found where the earth's near-surface thermal gradient is abnormally high. Evidence of a geothermal aquifer is unusually great volcanic, fumarole or geyser activity. Thus, as an example, geothermal aquifers are fairly common along the rim of the Pacific Ocean, long known for its volcanic activity.

In some regions of the world geothermal steam or water has been used for centuries as therapy to treat physical infirmities and diseases. Geothermal steam or water has also been used to heat dwellings and for industrial processes. Although efforts to develop these site-restrictive uses of geothermal resources continue, recent research and development effort has focused on producing electrical power from geothermal resources. The electrical power produced can be conducted long distances from the geothermal resource, often over existing power grids. This is particularly advantageous, since recent steep cost increases for petroleum products used to produce conventional electric power, as well as petroleum fuel shortages or embargoes, have resulted in the desire to find an alternative, and generally self-renewing, source of power plant "fuel."

In one process for producing electrical power, a naturally pressurized, hot, substantially liquid geothermal brine at over about 400° F. is flashed, reducing pressure and converting some of the brine to steam while cooling the remaining liquid geothermal brine. The steam produced in this manner then powers steam turbine generators. The cooled geothermal brine can often be used to advantage in binary systems in which a low-boiling point, secondary liquid in a closed loop is vaporized by the relatively hotter cooled geothermal brine, the vapor produced from the secondary liquid powering gas turbine generators. The cooled geothermal brine and the steam condensate obtained from power generation are typically injected into the ground to replenish the aquifer and prevent ground subsidence.

The highly saline hot brine from the wells used to generate geothermal power is a saturated or nearly saturated solution in many ions and minerals. As the brine is flashed many of these ions and minerals precipitate out. But some minerals form small particles and precipitate only slowly. If these slowly precipitating small particles of silicate containing minerals, such as iron silicate, are not forced out of solution before injection, they tend to precipitate in the injection wells, plugging them prematurely. Therefore, a flocculant must be added to the brine in settling tanks to speed the precipitations of these slowly precipitating minerals. U.S. Pat. No. 4,874,529 issued to Featherstone, the disclosure of which is hereby incorporated in full by reference, discusses the problem of fine particulates not precipitating and the use of a flocculating agent as the solution to the problem.

However, not all minerals precipitate from the brine solution slowly. Alkaline earth salts, for example, barium sulfate, also known as barite, and calcium fluoride, are among the minerals frequently found in large amounts dissolved in geothermal brines. Alkaline earth salts tend to precipitate fairly quickly. During the flashing step both barium sulfate and calcium fluoride start to precipitate out of solution, and both continue to precipitate during further handling. In many wells barium sulfate is present in concentrations high enough to start to precipitate when the brine temperature cools to as high a temperature as 340° F.

Recently it has been noticed that the crystalline material precipitated at some geothermal generation locations has become more radioactive as the location ages. This may be due to tapping into new formations containing trace amounts of the radioactive alkaline earth salt radium sulfate. Radium sulfate apparently coprecipitates with the chemically similar barium sulfate. Therefore, if barium sulfate precipitation can be inhibited, then the amount of radiation can be reduced.

At least some of the precipitate can be processed further to advantage, since it contains a high enough concentration of valuable minerals, for example, silver, to make mineral recovery, hereinafter called a "line mine," economical. U.S. Pat. No. 4,756,888 issued to Gallup et al. the disclosure of which is hereby incorporated in full by reference, teaches recovering silver in a line mine that is incorporated into a geothermal power plant and U. S. patent application Ser. No. 07/559,042 by Gallup et al., which is incorporated by reference in its entirety, teaches a process for precipitating precious metals from geothermal brines. However, calcium fluoride, the main fluoride mineral present, is present in the mined precipitate in concentrations high enough to corrode the metallurgical furnaces used for processing the precipitate. Therefore, much of these precipitates cannot be readily processed to extract the valuable minerals present.

Additives or dispersants that keep barium sulfate in solution are known. However, no dispersant has ever been used to mitigate the problems caused by calcium fluoride precipitation in geothermal systems. Moreover, the action of dispersants on barium sulfate is generally the opposite to flocculant action on siliceous materials. Clearly a method that prevents or inhibits radioactive scale and calcium fluoride from precipitating that does not interfere with the action of the flocculants used to settle slowly precipitating minerals is needed.

SUMMARY OF THE INVENTION

The precipitation of alkaline earth salts in a geothermal brine is reduced by contacting a geothermally derived solution with a precipitation dispersant. Preferred dispersants are selected from the group consisting of polyacrylic acid and polyphosphonic acid dispersants. The solution is then contacted with a flocculant to facilitate removal of slowly precipitating materials, such as silica, from solution.

The high temperature brine is subjected to a flashing step to produce steam. This step reduces the pressure and temperature of the brine. After the flashing step, as the alkaline earth minerals, including the barium sulfate/radium sulfate coprecipitate, start to precipitate out of solution, a dispersant is added to the brine. Both barium sulfate and calcium fluoride are inhibited from precipitating, and the radioactivity of the precipitate is substantially less than that observed in a precipitate when no dispersant is used. Surprisingly, this result is observed in vessels where a flocculant is simultaneously used to enhance the silica settling rate. The observed result of this invention is that some ions and minerals can be forced to remain in solution while others are forced out of solution. It is interesting and unexplained that neither the flocculant nor the dispersant seem to interfere with the action of the other.

BRIEF DESCRIPTION OF THE DRAWINGS

Like numbers in the various drawings refer to the same features. In particular, the various items shown in FIG. 1 are shown in FIGS. 2 and 3 with specific preferred components that perform the required functions.

DETAILED DESCRIPTION OF THE INVENTION

Figure 1:
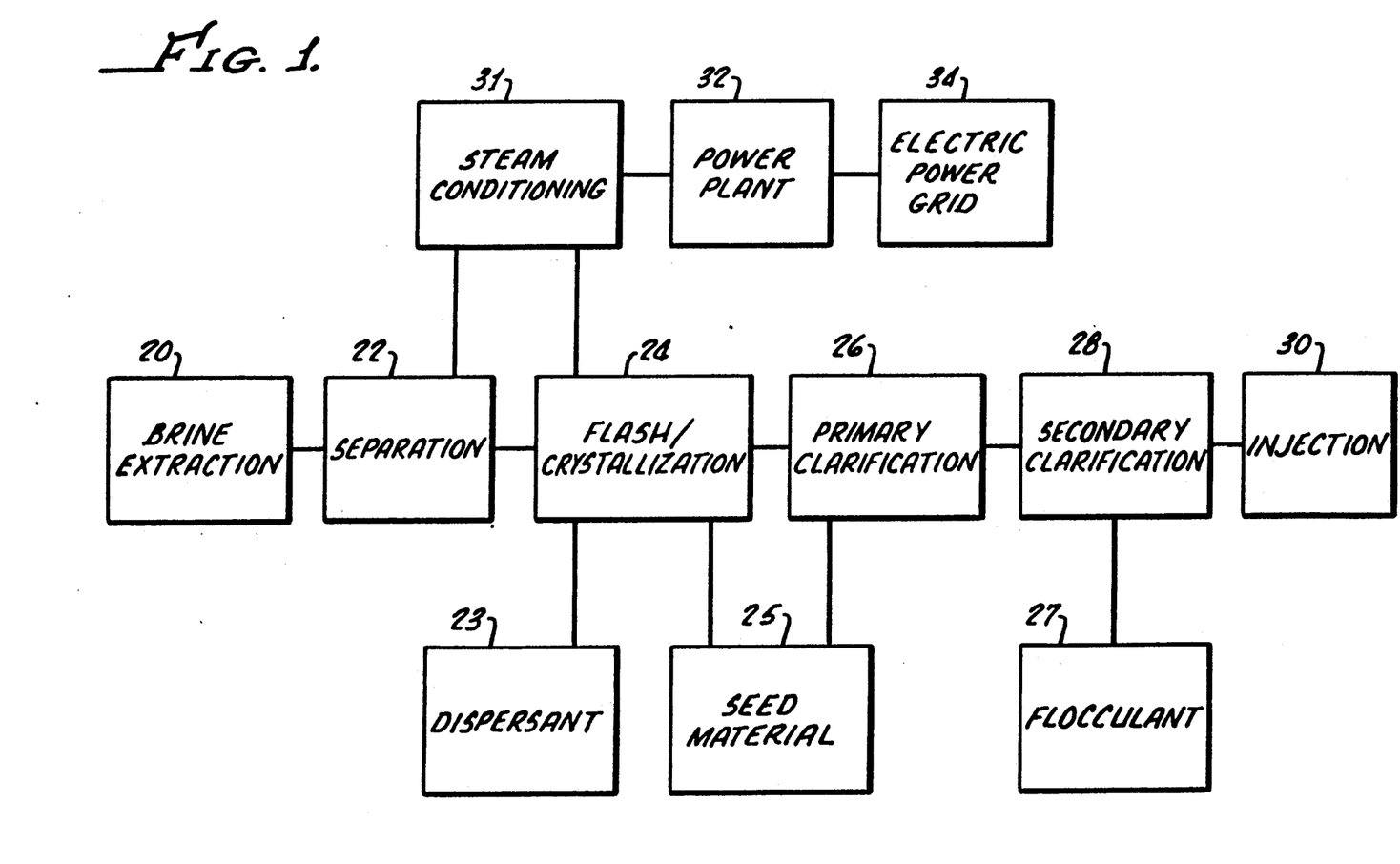
FIG. 1 shows a block diagram of a general layout of a geothermal plant that uses the process of this invention.

The process of this invention is used in a power generating facility where flocculant is added. Referring to FIG. 1, brine is pumped in a power generation facility from a well in brine extraction stage 20. The brine is introduced to wellhead separation stage 22 where steam is generated. This brine flows to a flash crystallization stage 24 where more steam is generated, concentrating the brine even more. This brine is then pumped to primary clarification stage 26, and finally secondary brine clarification stage 28, before the brine is injected into the earth at the brine injection stage 30. Seed material 25 gathered at the primary clarification stage 26 is circulated back to the flash crystallization stage 24. The dispersant 23 is normally added at the flash crystallization stage 24, and flocculant 27 is normally added at the secondary clarification stage 28. The steam formed at the wellhead separation stage 22 and the flash crystallization stage 24 is introduced first to a steam conditioning stage 31, and the cleaned steam is used in a power plant 32 to generate electric power for the electric power grid 34.

Figure 2:
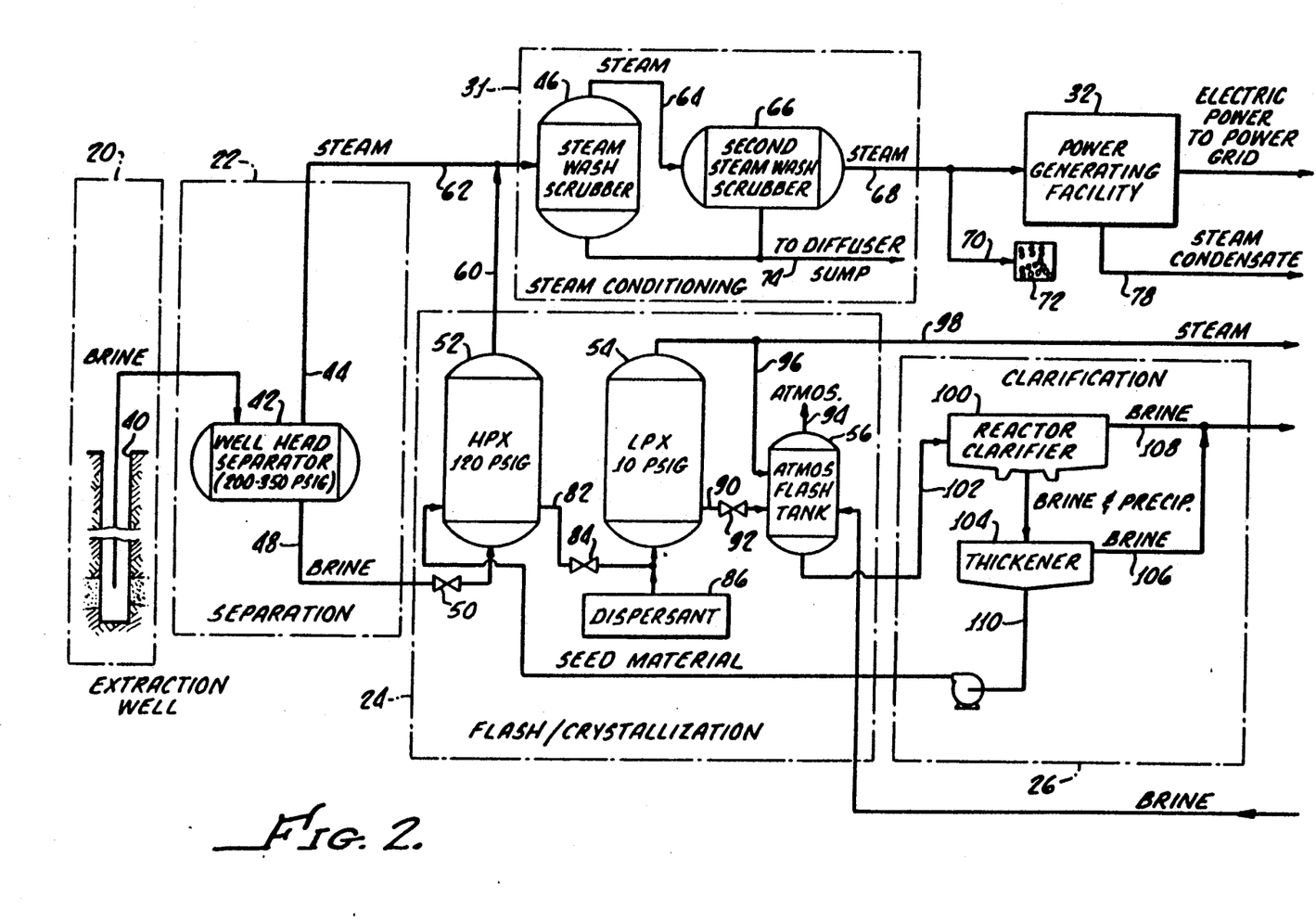
FIG. 2 shows a schematic drawing of one preferred layout.

In a specific preferred embodiment shown in FIG. 2, brine and steam from well 40 flow to wellhead separator 42. The steam and brine are under pressure of about 200 to 350 psig and a temperature of about 400° F. to 600° F. In the wellhead separator 42, steam and the non-condensible gases are separated from the brine. The steam flows through conduit 44 to the steam scrubber 46. The brine flows from wellhead separator 42 through conduit 48 and past flashing valve 50 into the bottom of a high pressure flash crystallizer (HPX) 52. The liquid remaining in HPX 52 flows to low pressure flash crystallizer (LPX) 54, and an atmospheric flash vessel 56. Steam is produced and silica crystallization is initiated at HPX 52, LPX 54 and the atmospheric flash vessel 56.

As the brine is flashed across flashing valve 50, from, for example 450 psig to a reduced pressure of, for example, about 120 psig, part of the brine is converted into high energy steam. Within HPX 52, the steam is separated from the brine. As an illustration, HPX 52 can provide about 95,000 pounds of steam per hour in a system extracting about 1.3 million pounds of brine per hour at about 450° F. and a pressure of about 450 psig at the well head separator. This steam flows from HPX 52 though conduit 60 into common steam discharge conduit 62, also receiving steam through conduit 44, to the steam scrubber 46. Partially cleaned steam is discharged from the steam scrubber 46, through conduit 64, to second scrubber 66. Clean steam is discharged from second scrubber 66, through conduit 68, to power generating plant 32. In the event the quality of steam discharged through conduit 68 from second scrubber 66 does not meet power generation requirements, for example, as to the level of total dissolved solids, the steam may be vented from conduit 70 to an atmospheric vent apparatus 72, for example, a rock-filled pit.

The mixture of wash water and steam condensate from scrubbers 46 and 66 is discharged, through conduit 72 to a diffuser sump 92. Steam condensate is returned from power generating plant 32, through a conduit 78 to a "condensate in" vessel 80 for disposal.

The flashing of the liquid brine in HPX 52 initiates the precipitation of siliceous material and alkaline earth salts. The brine and the precipitating siliceous material suspended in the brine in HPX 52 flow through conduit 82, past flashing valve 84, and into the bottom of LPX 54 at a temperature of about 340° F. It is preferred that the dispersant 86 is added to the liquid contained in LPX 54. About 0.5 to 8 ppmw, preferably 2 to 4 ppmw dispersant is added to the brine in conduit 82 before introduction in to LPX 54. As the brine flashes across flashing valve 84 to convert more of the brine into steam, the pressure is reduced further to, for example, about 10 psig. The mixture of brine and steam is then fed into LPX 54 for separation. For the exemplary brine extraction system mentioned above, the amount of steam separated from the brine in LPX 54 may also be about 95,000 pounds per hour. Such additional steam has less energy content than the steam separated in the HPX 52. Within LPX 54, additional silica may be deposited from the brine onto the silica particles entrained in the brine.

A dispersant is added via conduit 82 for subsequent introduction into LPX 54. Typically, the dispersant is added in a concentration between about 0.5 and 8 ppmw, preferably between 2 ppmw and 4 ppmw. The dispersant can be added at other stages in the process, but in general it is preferred to add the dispersant as soon as the brine cools enough for the dispersant to be thermally stable for the amount of time it takes for the added dispersant to be injected into the earth. A temperature of about 340° F. in the LPX 54 is cool enough for the addition of the dispersant. The dispersant is then carried through the stages of the power generating facility including the secondary clarifier stage (described more fully herein after) where the flocculant is added. The amount of barium sulfate that precipitates after treatment with the dispersant is far less than would be precipitated without the treatment.

Brine, the siliceous material suspended therein, and the added dispersant are discharged from LPX 54, through conduit 90. This brine solution flashes across a third flashing valve 92 in conduit 90, to atmospheric pressure, creating still more steam which is separated from the brine in atmospheric flash vessel 56. The additional steam formed has very little energy content and may be discharged from atmospheric flash vessel 56, through a conduit 94, into the atmosphere. Alternatively, the steam may be used for facility heating or other heating purposes. To some extent, silica from the brine continues to crystallize from the brine onto the suspended siliceous material in atmospheric flash vessel 56.

The steam discharged from LPX 54 is vented to a scrubber and a low pressure turbine to produce additional electricity.

Brine and suspended solids flow from the atmospheric flash vessel 56 into the primary clarification zone. First they flow to reactor-clarifier 100 through conduit 102. Ordinarily the brine overflow from thickener 104 is pumped through conduit 106 and combined with brine from reactor-clarifier overflow conduit 108, which, in turn, is discharged into secondary clarification stage 28. In this regard, it should be noted that the thickener overflow rate is much smaller than the reactor-clarifier overflow rate. As an illustration, if brine is extracted at the illustrative rate of about 1.3 million pounds per hour, the reactor-clarifier overflow rate may be about 1.1 million pounds per hour while the thickener overflow rate may be only about 70 thousand pounds per hour. Consequently, the thickener overflow into secondary clarification stage 28 from conduit 106 is greatly diluted by the reactor clarifier overflow in conduit 108. The suspended solids concentration in the thickener overflow is generally comparable with the suspended solids concentration of the reactor-clarifier overflow and is not usually critical. Brine from thickener 104 can be recycled in case the suspended solids concentration in the thickener overflow becomes excessive, for example, due to settling problems in reactor-clarifier 100. Such settling problems are avoided in part by providing a steam blanket for the reactor-clarifier over the brine in the reactor-clarifier. A portion of the brine from thickener 104 is removed through conduit 110 and pumped back to HPX 52 as seed material to initiate crystallization. Because of this recirculation a small amount of dispersant will be in HPX 52.

Figure 3:
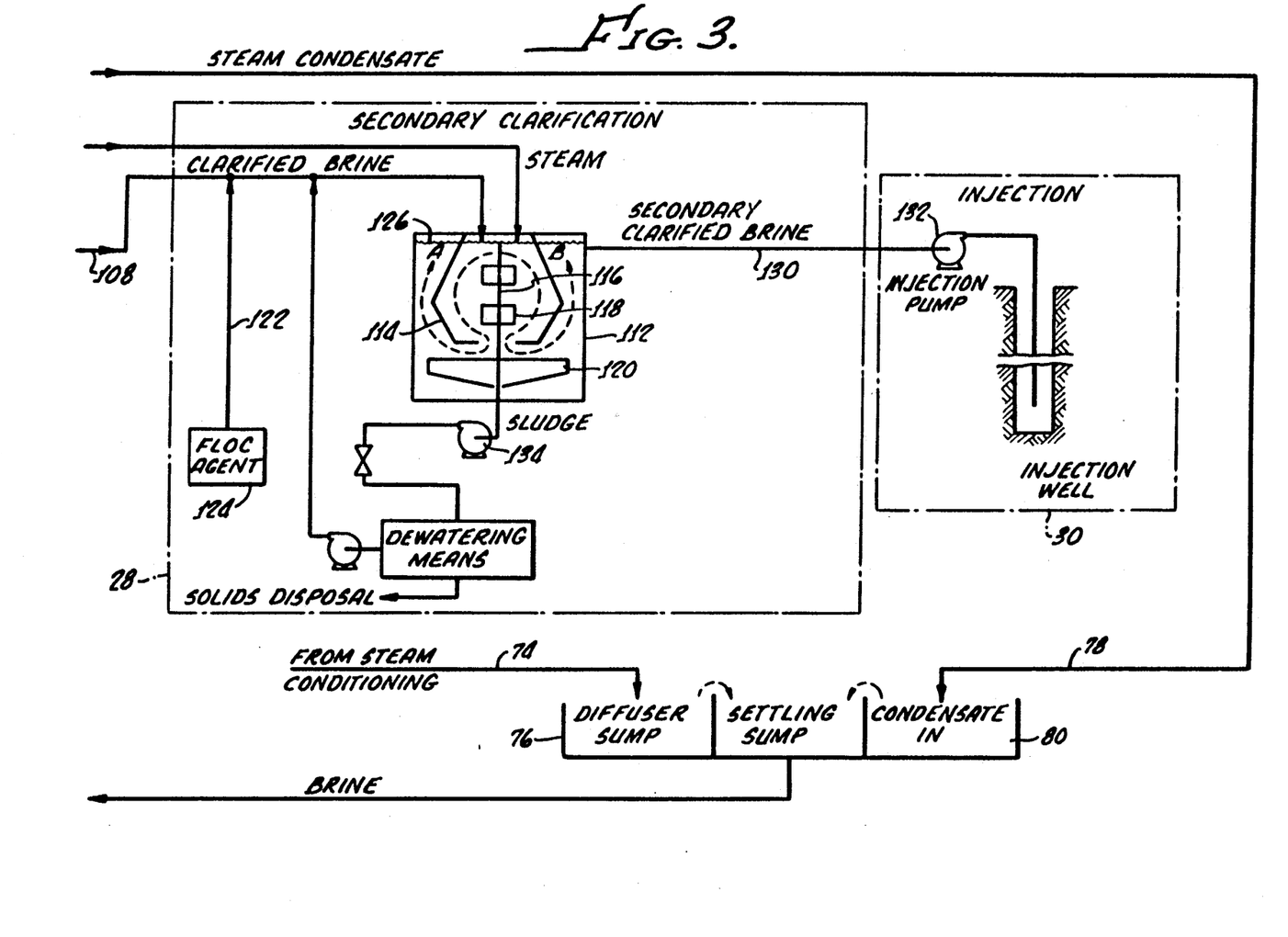
FIG. 3 shows a schematic drawing that is a continuation of the schematic shown in FIG. 2.

Secondary clarifier vessel 112, shown in FIG. 3 has a large internal reaction well 114 in which are mounted, on a vertical shaft 116, at least two rotatably driven mixing blades 118 Below a partially-open bottom of reaction well 114 are rotatably driven scraper blade means 120. Clarified brine effluent from reactor-clarifier 100 flows through conduit 108 into upper regions of secondary clarifier reaction well 114 along with thickener overflow from conduit 106, as described above. A flocculant is added through conduit 122 from the flocculant tank 124. A slipstream of steam, from LPX 54, flows through conduit 98, into secondary clarifier vessel upper regions 112 to provide a steam blanket 126 over the surface of the liquid in the secondary clarifier vessel 112. Increased brine acidification is prevented by the steam blanket 126 in vessel 112 that excludes air from the vessel, thereby preventing oxidation of ferrous ions (Fe II) naturally present in the brine to ferric ions (Fe III). The chemical compatibility of the brine and steam blanket are assured by obtaining the steam used to form the steam blanket from the brine at LPX 54. This prevents possible secondary clarification process upsets.

A flocculant, preferably either a cationic, anionic, or non-ionic polyacrylamide (or mixtures thereof) having a high molecular weight, usually above about one million, is preferably pumped from flocculant tank 124, through conduit 122 into brine effluent conduit 108, which is connected to the top of vessel 112. Within conduit 108, the flocculant is intermixed with the clarified brine overflows from both reactor-clarifier 100 and thickener 104 before the brine is discharged into secondary clarifier vessel 112. The brine and flocculant mixture in conduit 108 flows to secondary clarifier vessel 112. The inflowing mixture is naturally circulated downwardly through reaction well 114, while mixing blades 118 are rotated.

Reaction well 114 and vessel 112 are preferably constructed to provide a brine residence time in the reaction well between about 10 and about 20 minutes and to provide a total vessel brine residence time between about 45 and 150 minutes. Such residence times enable the fine residual solids suspended to be effectively flocculated and permit the flocculated material to settle to vessel 112 bottom. More preferably, to minimize vessel size, the brine residence times in reaction well 114 and vessel 112 are respectively about 10 minutes and about 45 minutes.

The secondary clarified brine overflow discharged from vessel 112 flows through overflow conduit 130 to injection pump 132 and is pumped into the earth in injection well 134. Preferably the secondary clarified brine overflow contains less than about 20 parts per million suspended solids, with the mean particle size being between about 3 and about 4 microns. Within vessel 112, the settled solids are raked, by means 120, to a solids-brine discharge conduit 134 located at the bottom of the vessel.

As the brine is processed, some dissolved ions and minerals, particularly the silicates, become supersaturated, but do not quickly settle out of solution. The resulting suspended particles are difficult to flocculate because of two reasons. First, the suspended particles in the brine are present only in a low concentration in the secondary clarifier vessel 112, and second, the particles typically are of small size. For example, the brine might contain a concentration of about 150 parts per million of particles having a mean size of about 4 or 5 microns. However, the present inventors have determined the surprising fact that adding flocculant in large amounts (even if one could use such amounts economically) retards rather than speeds the particle flocculation rate of the brine within vessel 112. Flocculant used in large amounts may cause the flocculant ions to repel each other, resulting in the observed retarding.

The particulate flocculation rate is again observed to be retarded if the brine flocculant mixing or circulation rate (for example, by the faster rotation of mixer blades 118) is increased. This unexpected effect is possibly due to the increased agitation rupturing molecular bonds in the long-chain flocculant molecules. It has been observed that flocculants have little or no effect on the amount of radiation or fluoride ion present in the precipitated solids.

The dispersant added to the brine inhibits radioactive materials and calcium fluoride from precipitating from the solution. Preferably the dispersant selected reduces radioactivity in the precipitate at least 33% from what is observed without the dispersant, more preferably the radioactivity is reduced at least 50%. Preferably, the dispersant selected reduces the amount of fluoride ion deposited in the scale by at least 25%, preferably at least 35%.

It is unexplained why a dispersant should inhibit some dissolved solids from precipitating in a system where a flocculant is used to accelerate the rate of precipitation of other solids. However, it is observed that adding dispersant to the cooling brine causes some minerals and ions to remain in solution, while the rate of precipitation of other solids is accelerated by the simultaneous addition of a flocculant. Preferred dispersants are selected from the group consisting of polyacrylates, phosphonomethylated amines, and polyphosphonic acids, all having molecular weights between about 2500 and 20,000, preferably less than 5000. The polyacrylates are especially preferred. A dispersant is added to the brine in concentrations between 0.5 and 8 ppmw, preferably between about 2 and 4 ppmw. The dispersant is preferably added at the LPX stage of the above described process, although it may be added at other points in the process. However, dispersants are thermally sensitive. If the addition temperature is too hot the dispersant will degrade. Therefore, preferably, at the point of dispersant addition, the brine is cool enough not to cause substantial thermal degradation to the dispersant before the brine is injected back into the earth. It is preferred that the dispersant be added to brine at a temperature of less than 400° F., preferably less than about 370° F., and most preferably less than 340° F.

The peculiar effect of adding a dispersant to a system containing a flocculant is emphasized by comparing the molecular formulas of the preferred classes of compounds. The preferred class of polyacrylate dispersants have a repeating structure represented by formula (1).

(1)

where R is an organic radical, selected from the group of alkyl radicals having six or fewer carbon atoms, or it is hydrogen and $y = 25$ to $200$.

The preferred flocculants, on the other hand, have the similar repeating structure represented by formula 2.

(2)

where $x = 10{,}000$ to $25{,}000$

Although the preferred dispersants and flocculants seem similar at a molecular level, their influence on particles in solution is directly the opposite. In general, it can be said that dispersants have a lower polymer molecular weight and a higher charge than flocculants. But why they have such different effects in the same system is unclear.

The solubility of ions and minerals in geothermal brines is complex because brines are so concentrated in strong electrolytes, in particular, sodium, potassium, and calcium chlorides. When the brine solution cools, the composition of the solution, as well as the composition of the precipitates from the solution, is dictated by the concentration of all the strong electrolytes, as well as all other ions as well. As an example, generally, in aqueous solution, barium sulfate has decreasing solubility with decreasing temperature. Therefore, usually barium sulfate will precipitate from an aqueous solution as the solution cools. In the case of a simple aqueous solution the effect of adding a dispersant on the precipitation behavior of barium sulfate can be readily predicted. However, in the case of geothermal brine, the precipitation behavior of barium sulfate is complex. As a result of the complex behavior of geothermal brines, the effect of an added dispersant on the precipitation of barium sulfate cannot be reasonably predicted beforehand. However, under the conditions frequently found in geothermal brines, barium sulfate starts to precipitate out of solution when the brine cools to about 340° F. It is sparingly soluble at 220° F., which is normally about the temperature of the brine injected back into the earth.

EXAMPLES

The invention is further described by the following examples, which are illustrative of various aspects of the invention and are not intended as limiting the scope of the invention as defined by the appended claims.

EXAMPLES 1 THROUGH 7

Clarified brine was taken from a commercially operated geothermal power plant. The brine taken for testing the concentration of primary solids was taken from the brine effluent conduit 108. The brine for testing the concentration of secondary solids was taken from the secondary clarifier overflow 130. The brine taken for testing the amount of scaling had a temperature of about 220° F. and was under a pressure of about 100 psig. A series of tests, each test lasting for up to about 120 hours, were performed on the dispersants listed in Table I. The concentrations of solids and amounts of scale produced from brine when the various dispersants were added to the flash/ crystallizer were compared to the properties of untreated brine. The results were tabulated in Table I. The properties measured were total scale deposited, $BaSO_4$ deposited, $CaF_2$ deposited, radioactivity, radioactive nucleotides deposited, and the concentration of solids in the brine.

Clarifier Solids

Geothermal fluid was obtained from the primary clarifier overflow 108 and the reaction well 114 from the secondary clarifier in a geothermal plant. The amount of particulates was measured by light scattering of a sample in a transparent tube, with the results observed being discussed below and summarized in Table I.

Scale

A clarified geothermal fluid obtained from the secondary clarifier 130 comprised about 70 percent by weight brine and about 30 percent by weight steam. The geothermal fluid has a temperature of 220° F. and a pressure of 100 psig. The brine contained about 251,000 ppmw of various elements dissolved therein: less than 0.3 aluminum, 0.2 silver, 1.0 antimony, 12.8 arsenic, 319 boron, 200 barium, 103 bromine, 1.2 cadmium, 25,000 calcium, 149,000 chlorine, 0.06 chromium, 12 cesium, 5.2 copper, 0.4 fluorine, 459 iron, 5 iodine, 13,500 potassium, 1,770 lithium, 49 magnesium, 793 manganese, 50,000 sodium, less than 0.1 nickel, 81 lead, 73 rubidium, less than 1 selenium, 200 silicon, 400 strontium, at least 25 sulfate, and 302 zinc.

The apparatus utilized in the tests includes a three inch conduit along with a first corrosion/scale inspection spool. The brine flows through and then exited the system through a second corrosion/scale inspection spool. The two corrosion/scaling spools are sections of conduit which hold conventional carbon steel corrosion strips to monitor the corrosiveness of brine. The second corrosion/scale spool was of a length sufficient to provide a total residence time of about 1 minute for the brine flowing through the test apparatus. At the exit from the simulated injection conduit the brine is normally at a temperature of about 220° F.

Scale buildup on the piping can be measured by gamma radiographic techniques employing an Iridium 92 source. The source and film plate are positioned on opposite sides of the area of interest. The differences in gamma absorption of the brine, scale and steel results in sufficient contrast to produce a radiograph from which projected thickness of scale can be measured. At the conclusion of each test, the two corrosion/scaling spools were removed and inspected, with the results observed being discussed below and summarized in Table I.

Radioactivity

Scale from a geothermal plant was analyzed using gamma ray spectroscopy. The amounts of the radioactive nucleotides $Ra^{226}$, $Ra^{228}$, $Th^{232}$ were determined by the amount of the characteristic gamma radiation each emits, and the decrease in that amount of each after use of the dispersant noted. The results of the spectroscopy are shown in Table II.

TABLE I

| | Test Results % Decrease | | | | |
|---|---|---|---|---|---|
| Type | Scale | BaSO4 | CaF2 | Primary Clarifier Solids | Secondary Clarifier Solids |
| Example 1 Polymeric phosphonic acid | 26 | 59 | 38 | 5 | −17 |
| Example 2 Polyacrylate | 2 | 77 | 76 | 14 | −32 |
| Example 3 Phosphono-methylated amine | 44 | 97 | 95 | 4 | 6 |
| Example 4 Polyethylene imine | 31 | 35 | 26 | N.D. | N.D. |
| Example 5 Polyacrylate | 53 | 93 | 92 | 42 | 69 |
| Example 6 Polymeric phosphonic acid | 47 | 86 | 89 | 41 | 41 |
| Example 7 Polyacrylate | 13 | 90 | 95 | 21 | 35 |

Note: The negative values indicate an increase in the amount of secondary clarifier solids observed.

It can be seen from Table I that the best dispersants, in terms of reducing BaSO4 and CaF2, were the dispersants of Example 2 and 7, both polyacrylates, and the dispersant of Example 3, a phosphonomethylated amine. Oddly, the dispersant of Example 2 resulted in an increase in solids in the primary clarifier. The significance of this increase is unclear, but overall the polyacrylate of Example 2 is the preferred dispersant. All dispersants tested resulted in some decrease in BaSO4 and CaF2.

TABLE II

| Example | Type | pCi/g Ra-226 | % Decr vs Baseli | pCi/g Ra-228 | % Decr vs Baseli | PCi/g Th-232 | % Decr vs Baseli |
|---|---|---|---|---|---|---|---|
| | Base Line | 100 | | 150 | | 12 | |
| 1 | Polym.phosph A | 58 | 42 | 80 | 47 | 7 | 42 |
| 2 | Polyacrylate | 21 | 79 | 30 | 80 | 2.2 | 82 |
| 3 | Phosp methy am | 12 | 88 | 20 | 87 | 1.7 | 86 |
| 4 | Poly eth imine | 90 | 10 | 130 | 13 | 8.6 | 28 |
| 5 | Polyacrylate | 28 | 72 | 40 | 73 | 3.9 | 68 |
| 6 | Polyphos acid | 34 | 66 | 52 | 65 | 5.4 | 55 |
| 7 | Polyacrylate | 15 | 85 | 23 | 85 | 1.5 | 88 |

It can be seen from Table II that the dispersants of examples 2 and 7, both polyacrylates, and the dispersant of example 3, a phosphonomethylated amine, reduced the amount of radioactivity found in the deposited scale the most.

Although this invention has been primarily described in conjunction with examples and by references to embodiments thereof, it is evident that the foregoing description will suggest many alternatives, modifications, and variations to those skilled in the art. Accordingly, the spirit and scope of the appended claims are intended to embrace within the invention all such alternatives, modifications, and variations.

What is claimed is:

1. A method for reducing the precipitation of alkaline earth salts from a geothermal brine comprising:
   reducing the pressure and temperature of a geothermal brine;
   adding a dispersant to the brine in a concentration effective to inhibit the precipitation of alkaline earth salts selected from the group consisting of alkaline earth fluoride slats and radioactive alkaline earth salts after the temperature and pressure of the brine have been reduced; and
   facilitating the precipitation of silicon-containing particles from the brine with a flocculent after contacting the brine with the dispersant.

2. The method of claim 1 wherein the adding step further comprises adding a dispersant selected from the group consisting of polyacrylates, polyphosphonic acids, polyethylene imines, and phosphonic amines.

3. The method of claim 2 wherein the dispersant is a polyacrylate derived dispersant having a repeating unit represented by the following formula:

where R is an organic radical or hydrogen and y=25 to 200.

4. The method of claim 3 wherein between 0.5 and 8.0 ppmw of the dispersant is mixed with the brine.

5. The method of claim 1 wherein the reducing step comprises a series of discrete steps wherein the temperature and pressure are reduced incrementally, including a flash crystallization step.

6. The method of claim 5 wherein the flash crystallization step comprises a high pressure flash crystallization stage and a low pressure flash crystallization stage.

7. The method of claim 6 wherein the dispersant is added to the low pressure flash crystallization stage.

8. The method of claim 6 wherein the facilitating step comprises recirculating at least some of the solids precipitated in the facilitating step to the reducing step.

9. The method of claim 8 wherein the solids recirculated contain at least 0.25 ppmw dispersant.

10. The method of claim 8 wherein the solids derived from the geothermal brine are recirculated to a flash crystallization stage wherein the dispersant is added.

11. The method of claim 10 wherein the adding step further comprises adding the dispersant to the brine at a temperature of no more than 400° F.

12. The method of claim 1 wherein the dispersant is added to the geothermal brine after the geothermal brine has cooled to less than 400° F.

13. The method of claim 1 wherein the facilitating step comprises contacting the geothermal brine with a flocculant having a repeating unit represented by the following formula:

where x=10,000 to 25,000.

14. The method of claim 1 wherein the silicon containing particles precipitated after adding dispersant to the brine emits less radioactivity than scale precipitated before adding the dispersant emits.

15. The method of claim 14 wherein the amount of radioactivity emitted by a scale deposited by the brine is reduced by at least 33%.

16. The method of claim 1 wherein the adding step comprises adding a dispersant that inhibits precipitation of a scale containing more than 0.04 ppmw fluoride ion.

17. The method of claim 16 wherein the concentration of fluoride ion in a scale deposited by the brine is reduced by at least 25%.

18. A method including the steps of obtaining a hot geothermal brine from the earth, obtaining steam from the geothermal brine, adding a flocculent to the brine to facilitate precipitation of silicon-containing particles from the brine, precipitating silicon-containing particles from the brine, and injecting the brine back into the earth, comprising:
adding a dispersant to the brine as steam is obtained from the brine in an amount effective to inhibit precipitation of alkaline earth metal salts selected from the group consisting of radioactive alkaline earth salts and fluoride containing alkaline earth salts before the flocculent is added in an amount sufficient to facilitate precipitation of silicon-containing particles.

19. The method of claim 18 wherein the adding step further comprises adding to the geothermal brine a dispersant selected from the group consisting of polyacrylates, polyphosphonic acids, polyethylene imines, and phosphonomethylated amines.

20. The method of claim 19 wherein the adding step further comprises adding to the geothermal brine a polyacrylate derived dispersant represented by the following formula:

where R is an organic radical or hydrogen and y=25 to 200.

21. The method of claim 20 wherein between 0.5 and 8.0 ppmw of a dispersant is added to the geothermally derived solution.

22. The method of claim 18 wherein the adding step is performed after the geothermal brine has cooled to less than 400° F.

23. The method of claim 18 wherein the solids precipitated form a scale emitting more than background radioactivity and the adding step reduces the amount of radioactivity emitted by the scale by at least 33%.

24. The method of claim 18 wherein the solids precipitated form a scale containing at least 0.04 ppmw fluoride ion and the adding step reduces the concentration of fluoride by at least 25%.

25. A method for reducing radioactivity and fluoride minerals precipitated from a geothermal brine comprising:
flashing a brine saturated with dissolved solids which emit an amount of radioactivity greater than a background level of radioactivity and containing at least 0.04 ppmw fluoride ion to produce steam and initiate the crystallization of solids;
inhibiting the precipitation of radioactive minerals and fluoride containing minerals by adding to the brine between 0.5 and 8 ppmw of a dispersant having a molecular weight of between 2500 and 20,000;
facilitating precipitation of silicon containing particles from the brine by adding 0.1 to 1.0 ppmw of a polyacrylamide flocculant having a molecular weight greater than 100,000; and
injecting the brine into the earth.

26. The method of claim 25 wherein the inhibiting step further comprises adding a dispersant selected from the group consisting of polyacrylates, polyphosphonic acids, polyethylene imines, and phosphonomethylated amines.

27. The method of claim 25 wherein inhibiting step further comprises adding a polyacrylate derived dispersant having a repeating unit represented by the following formula:

where R is an organic radical or hydrogen and y=25 to 200.

28. The method of claim 27 wherein the amount of radioactivity emitted by the precipitated solids is decreased by at least 33%.

29. The method of claim 27 wherein the amount of fluoride ion precipitated is reduced at least 25%.

30. The method of claim 27 wherein the facilitating step further comprises adding a flocculant represented by a repeating unit represented by the following formula:

where x=10,000 to 25,000.

31. The method of claim 25 wherein the inhibiting step further comprises adding the dispersant to the geothermal brine after the brine has cooled to less than 400° F.

32. A method comprising:
introducing a geothermal brine containing silicon-containing components into a clarification zone wherein said silicon-containing components form particles that separate from the brine by gravity aided by an added flocculent; and
introducing into said clarification zone a dispersant for inhibiting precipitation of one or more alkaline earth compounds selected from the group consisting of radioactive alkaline earth salts and fluoride ion containing alkaline earth salts.

33. The method of claim 32 wherein said dispersant is added to said brine before said flocculant.

34. The method of claim 33 wherein the dispersant is selected from the group consisting of polyacrylates, polyphosphonic acids, polyethylene imines, and phosphonomethylated amines.

35. The method of claim 33 wherein the geothermally derived solution is contacted with a polyacrylate derived dispersant having a repeating unit represented by the following formula:

where R is an organic radical or hydrogen and y=25 to 200.

36. The method of claim 33 wherein said flocculant comprises a compound having a repeating unit represented by the following formula:

where x=10,000 to 25,000.

37. The method of claim 33 further comprising adding the dispersant to the geothermal brine after the brine has cooled to less than 400° F.

38. A method comprising:
introducing a geothermal brine containing solid particles comprising silica and dissolved alkaline earth salts into a clarification vessel wherein said particles separate from the brine by gravity aided by an added flocculant; and
reducing the amount of alkaline earth salts precipitated from the brine by adding to the brine an effective amount of a dispersant for one or more alkaline earth compounds selected from the group consisting of alkaline earth fluoride salts and radioactive alkaline earth salts.

39. The method of claim 38 wherein said dispersant is added to said brine before said flocculant is added.

40. The method of claim 38 wherein the dispersant is selected from the group consisting of polyacrylates, polyphosphonic acids, polyethylene imines, and phosphonomethylated amines.

41. The method of claim 39 further comprising contacting the geothermal brine with a polyacrylate derived dispersant having a repeating unit represented by the following formula:

where R is an organic radical or hydrogen and y=25 to 200.

42. The method of claim 41 further comprising contacting said brine with a flocculant comprising a compound having a repeating unit represented by the following formula:

where x=10,000 to 25,000.

43. The method of claim 39 further comprising adding the dispersant to the geothermal brine after the brine has cooled to less than 400° F.

44. A method for reducing radioactivity precipitated from a geothermal brine comprising:
flashing a brine saturated with dissolved solids which emit an amount of radioactivity greater than a background level of radioactivity to produce steam and initiate the crystallization of solids;
inhibiting the precipitation of radioactive minerals by adding to the brine between 0.5 and 8 ppmw of a dispersant having a molecular weight of between 2500 and 20,000;
facilitating precipitation of silicon containing particles from the brine by adding 0.1 to 1.0 ppmw of a polyacrylamide flocculant having a molecular weight greater than 100,000; and
injecting the brine into the earth.

* * * * *